United States Patent [19]

Nakata et al.

[11] Patent Number: 5,419,413
[45] Date of Patent: May 30, 1995

[54] LUBRICATION SYSTEM FOR A TOOL HOLDER

[75] Inventors: Kenji Nakata, Kawaguchi; Hiroshi Sasaki, 16-11, Mihara 2, Hakodate, both of Japan

[73] Assignee: Hiroshi Sasaki, Hakodate, Japan

[21] Appl. No.: 267,207

[22] Filed: Jul. 6, 1994

[30] Foreign Application Priority Data

Jul. 6, 1993 [JP] Japan ............... 5-036991 U

[51] Int. Cl.⁶ .............................................. F01M 9/00
[52] U.S. Cl. .................... 184/6.14; 184/27.1; 409/135
[58] Field of Search ............ 184/6.14, 6, 31, 27.1, 184/27.2; 408/137; 409/135

[56] References Cited

U.S. PATENT DOCUMENTS

| 2,342,251 | 2/1944 | Burt | 184/6.14 |
| 4,741,650 | 5/1988 | Nakata | 408/137 |
| 5,033,921 | 7/1991 | Yasuhara et al. | 409/135 |

FOREIGN PATENT DOCUMENTS

| 473189 | 4/1951 | Canada | 184/6.14 |
| 3181142 | 12/1991 | Japan | 409/135 |

*Primary Examiner*—Thomas E. Denion
*Attorney, Agent, or Firm*—Jacobson, Price, Holman & Stern

[57] ABSTRACT

In construction of a tool holder used for boring or tapping by vibratory rotation of a tool such as a cutter, rotation is transmitted to the tool by a rotary holder in a casing and vibration is transmitted to the tool by a vibration piece eccentrically coupled to a drive shaft. An outer oil reservoir is formed between the rotary holder and the casing whereas an inner oil reservoir is formed between the rotary holder and the vibration piece. A pump unit is arranged within the first oil conduit for communicating the two oil reservoirs so as to allow flow of oil from the inner oil reservoir to the outer oil reservoir only when the vibration piece performs a composite movement. The second oil conduit is formed in the vibration piece in order introduce oil in the outer oil reservoir into a space present at the joint of the vibration piece to the drive shaft. As the vibration piece perform the composite movement derived from rotations of the drive shaft and the rotary holder, periodical difference in pressure starts between the two oil reservoirs, which intermittently opens the pump unit in one way only. As a result, oil in the oil reservoirs is intermittently but constantly fed to the vibration piece via the oil conduits for lubrication purposes.

4 Claims, 5 Drawing Sheets

LUBRICATION SYSTEM FOR A TOOL HOLDER

BACKGROUND OF THE INVENTION

The present invention relates to a lubrication system for a tool holder, and more particularly relates to improvement in lubrication of a tool holder generally used for vibration cutting such as vibration boring or vibration tapping.

Such vibration cutting is widely known to public and used in real production of various mechanical parts. One example of vibration cutting is disclosed in Japanese Patent Publication Hei 2-7769 issued in 1990.

In vibration cutting, a tool held by a tool holder rotate about its own longitudinal axis whilst concurrently revolving about the primary axis, usually the center axis, of the tool holder. Since the tool is held by a tool holder shaft of the tool holder which is operationally coupled to a drive shaft rotatably mounted to a casing of the tool holder. Thus in operation, the tool holder shaft needs to be driven for vibratory rotation, which is composed of slow rotation about its own longitudinal axis and quick revolution about the primary axis of the tool holder.

More specifically, the drive shaft is rotatably mounted to the tubular easing for rotation about the primary axis and connected at its proximal end to a given drive source. The drive shaft is provided on its distal end with an eccentric pin having a secondary axis deviated from the primary axis. A rotary holder is arranged within the casing surrounding the eccentric pin on the drive shaft for rotation about the primary axis at a speed lower than that of the drive shaft. The rotary holder may be coupled either to the drive shaft via a reduction unit or to a separate drive source of a low speed of rotation. The tool holder shaft is coaxially carried by the rotary holder in an arrangement such that it is able to rotate about its own longitudinal axis while concurrently revolving about the primary axis. A vibration piece is rotatably inserted over the eccentric pin either directly or via a bearing. The vibration piece is provided with a radially extending transmission rod which is received at its outer end in the rotary holder in a longitudinally slidable and laterally rotatable fashion. A transmission bar is slidably coupled to the distal end of the vibration piece and connected to the proximal end of the tool holder shaft at a spot deviated from the primary axis.

As the drive shaft rotates, the vibration pin is driven for a composite movement which is composed of low speed rotation about the secondary axis and high speed revolution about the primary axis. This composite movement of the vibration piece is transmitted, via the transmission bar, to the tool holder shaft to cause the vibratory rotation of the latter.

In the above-described construction, the joint between the eccentric pin and the vibration piece forms the heart of the tool holder and is subjected to the maximum sliding contact. Conventionally, lubrication oil is initially fused into a space in the joint or into a bearing present at the joint and there is no positive supply of lubrication oil to the joint. The initial lubrication of a limited amount cannot endure the maximum sliding contact at the joint over a long period of use. Deterioration in quality of the initial lubrication often accompanied with gradual reduction in quantity tends to cause serious seizure at the joint.

SUMMARY OF THE INVENTION

It is the basic object of the present invention to assure constant, positive supply of lubrication oil to the joint between the eccentric pin on the drive shaft and the vibration piece on a tool holder, thereby minimizing occurrence of serious seizure at the joint.

In accordance with the basic aspect of the present invention, a rotary holder defines a tubular, outer oil reservoir surrounded by a casing whereas a vibration piece defines a tubular, inner oil reservoir surrounded by the rotary holder. The first pump unit is arranged in the first oil conduit extending between the inner and-outer oil reservoirs and allows flow of oil from the inner to outer oil reservoir only. The second oil conduit is formed in the vibration piece in order to communicate the outer oil reservoir to the joint between the eccentric pin and the vibration piece.

The composite movement of the vibration piece derived from rotation of the drive shaft creates a pressure difference between the two oil reservoirs and such pressure difference forces the first pump unit to allow the flow of oil from the inner to outer oil reservoir and further from the outer oil reservoir to the joint between the eccentric pin and the vibration piece.

In a preferred embodiment of the lubrication system in accordance with the present invention, an oil storage surrounded by the casing is formed around the tool holder shaft and communicated to the outer oil reservoir via the second oil conduit formed in the rotary holder. The second pump unit is arranged in the second oil conduit in order to allow flow of oil from the oil storage to the outer oil reservoir only.

DESCRIPTION OF THE PREFERRED EMBODIMENTS

Figure 1:
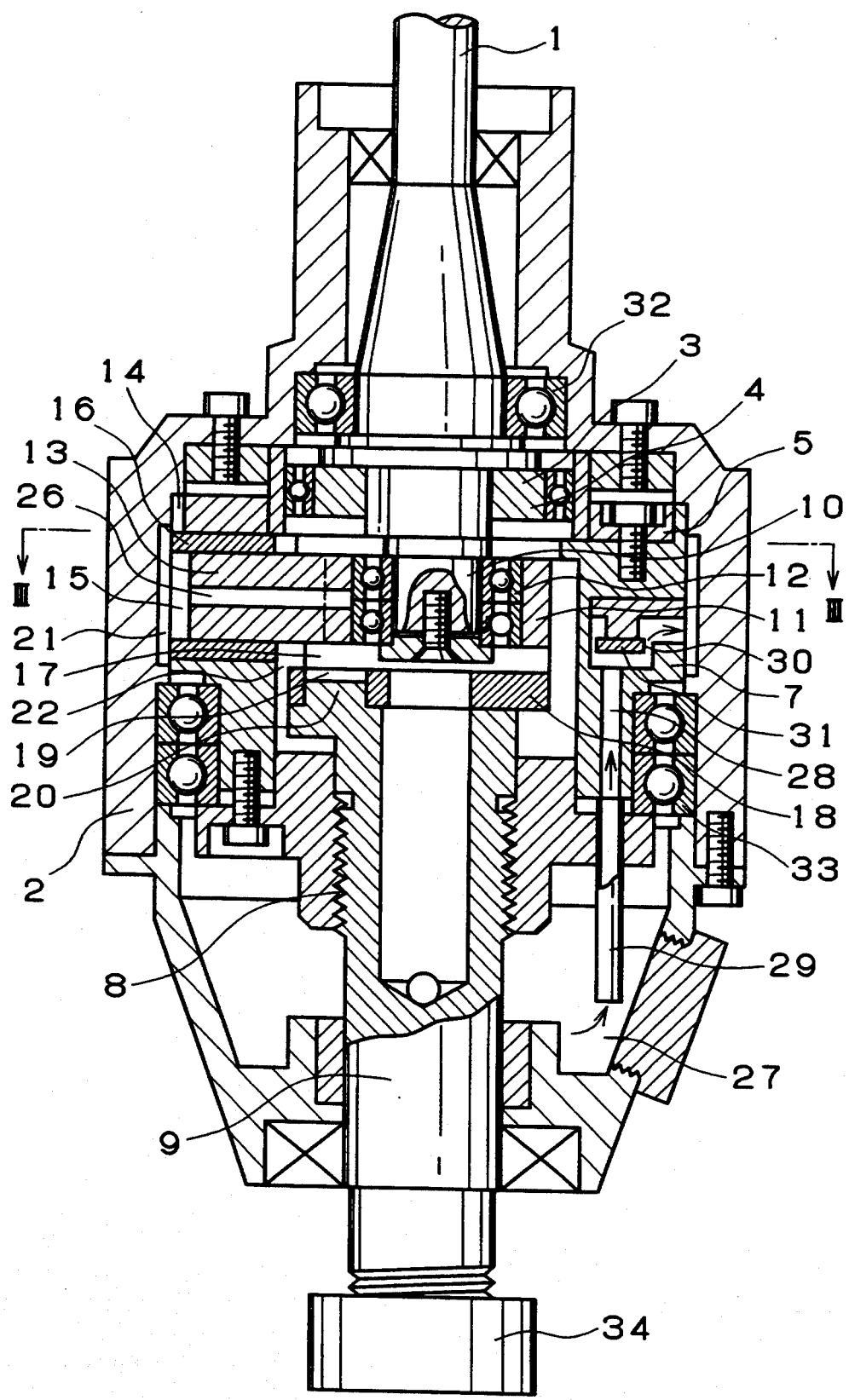
FIG. 1 is a side view, partly in section, of a tool holder incorporating one embodiment of the lubrication system in accordance with the present invention.
Figure 2:
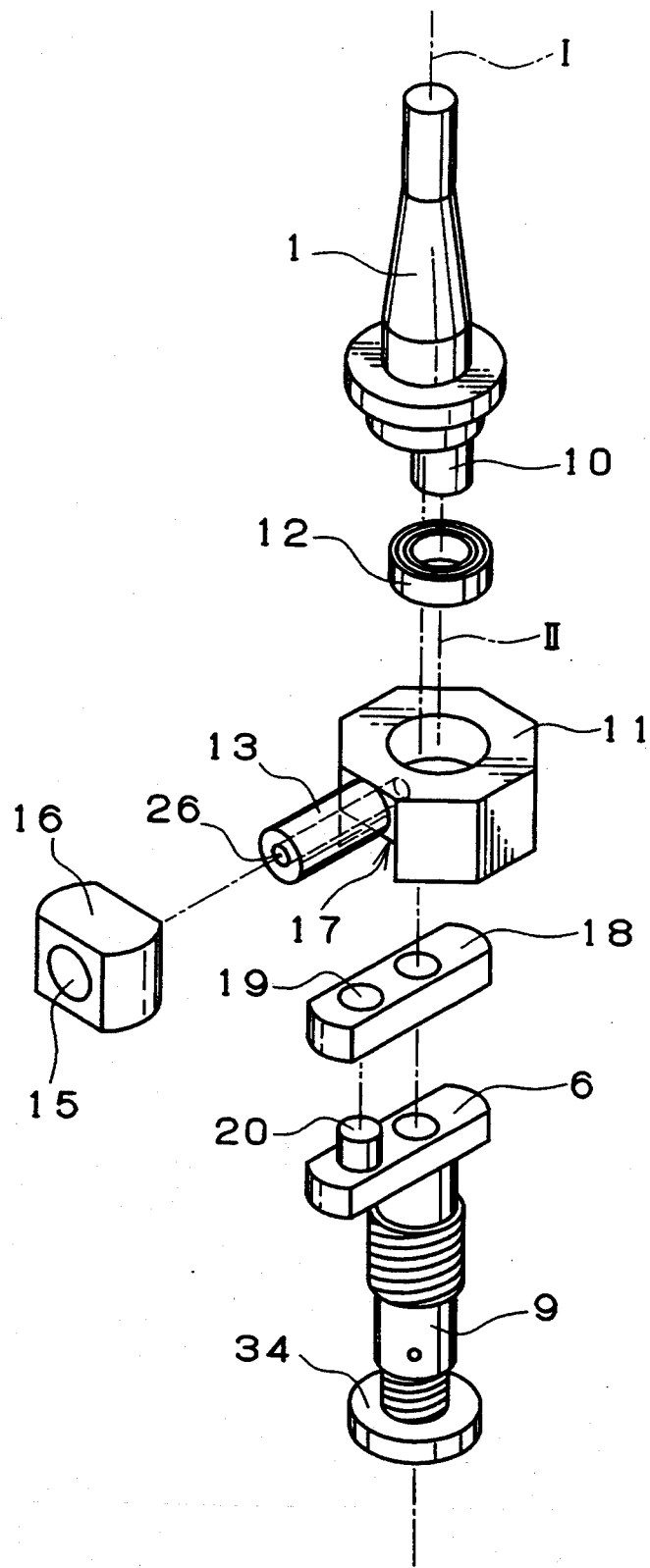
FIG. 2 is a perspective view of the main part of the tool holder shown in FIG. 1 in a disassembled state.
Figure 3:
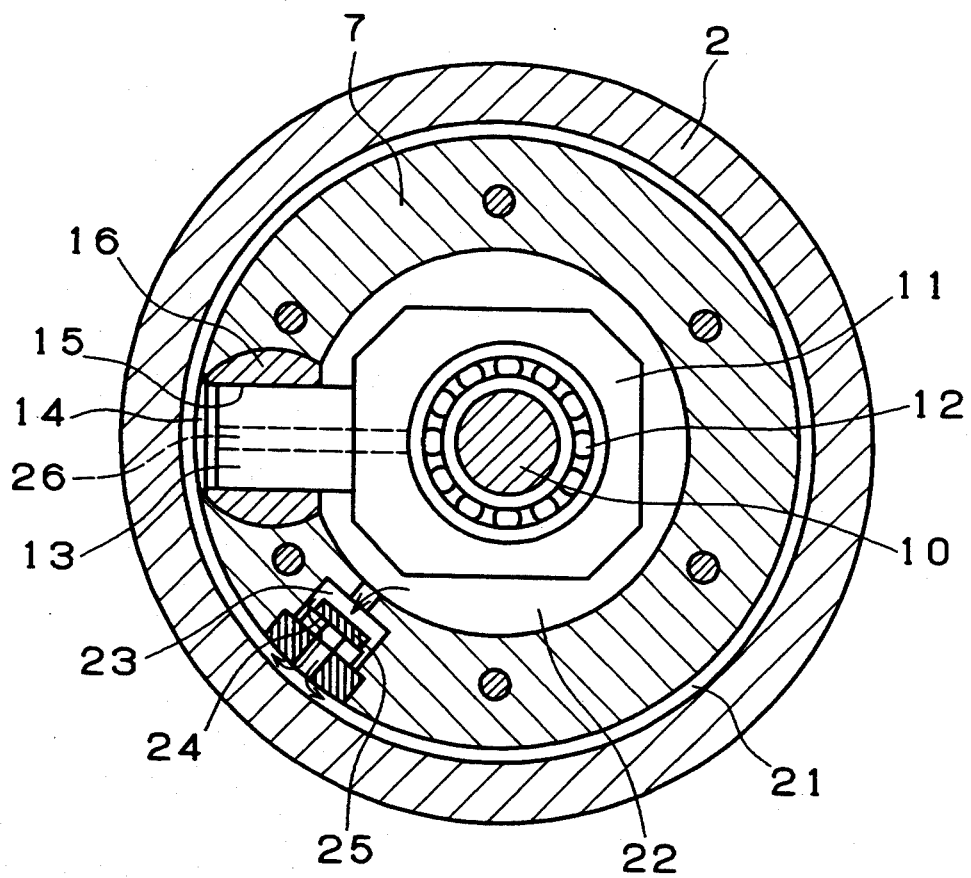
FIG. 3 is a section taken along a line III—III in FIG. 1.

One typical embodiment of the tool holder to which the present invention is advantageously applied is shown in FIGS. 1 through 3. In the drawing, the upper end (proximal end) of the tool holder is connected to a proper drive source (not shown) and the lower end (distal end) of the tool holder is connected to a proper tool such as a cutter (not shown). In the case of this embodiment, a reduction unit is used for reducing speed of rotation during its transmission from the proximal end to the distal end of the tool holder.

At the proximal end of the tool holder, a drive shaft 1 is rotatably mounted to a tubular casing 2 via a bearing 32. The axis of this drive shaft 1 will hereinafter be referred to as "the primary axis". The drive shaft 1 is connected at its proximal end to a proper drive source such as a main shaft in an associated machining center or a drive motor of a tapping machine. The drive shaft 1 is further connected at its distal end to a reduction unit 3 which is made up of an input side high speed shaft 4 and an output side low speed shaft 5. Such a reduction unit 3 is available in marked, for example, under a trade name "harmonic drive". This reduction unit has a coaxial three layer construction including a vibration generator, a flexible spline and a circular spline.

A tubular rotary holder 7 is secured to the distal end of the reduction unit 3, i.e. the output side low speed shaft 5. A bearing 33 is interposed between the casing 2 and the rotary holder 7. The rotary holder 7 is provided near its distal end with a female thread 8. When the tool holder is used for formation of threaded holes, the pitch of this female thread 8 should preferably be designed close to that of the threaded holes. A tool holder shaft 9 is in screw engagement near its proximal end with the female thread 8 in the rotary holder 7 whilst leaving a slight screw gap which allows the later-described vibratory rotation of the tool holder shaft 9. The distal end of the tool holder shaft 9 projects from the casing 2 and provided with a tool chuck 34 for holding a tool to b,e mounted to the tool holder. Thus, the drive shaft 1, the rotary holder 7 and the tool holder shaft 9 extend in a substantially coaxial alignment.

The drive shaft 1 is provided at its distal end with an eccentric pin 10 which extends into the rotary holder 7. The axis of the eccentric pin 10 will hereinafter be referred to as "the secondary axis". The extent of deviation of the secondary axis H from the primary axis I is designed in consideration of the magnitude of vibration to be imparted to the tool holder shaft 9 in operation.

A tubular vibration piece 11 is inserted concentrically over the eccentric pin 10 via a bearing 12. The vibration piece 11 is provided with a radially projecting transmission rod 13. As best seen in FIG. 3, the outer end of the transmission rod 13 is received in the rotary holder 7. More specifically, a radial cutout 14 is formed in the rotary holder 7 and defined by a pair of opposite round walls which extend in parallel to the primary axis I . A holder piece 16 is idly accommodated in the radial cutout 14 in an arrangement rotatable about an axis which is parallel to the primary axis I. A through hole 15 is formed in the holder piece 16 extending normal to the primary axis I in order to slidably receive the transmission rod 13 of the vibration piece 11. Thus, as the rotary holder 7 rotates about the primary axis I following rotation of the drive shaft 1, the vibration piece 11 on one hand rotates about the secondary axis n , i.e. the axis of the eccentric pin 10. Concurrently with this, the eccentric Din 10 revolves about the primary axis I. Because the vibration piece 11 is concentrically inserted over the eccentric pin 10, the vibration pin 11 also revolves about the primary axis I. Consequently, the vibration piece 11 performs a composite movement which includes concurrent rotation about the secondary axis R and revolution about the primary axis I. During this composite movement, the transmission rod 13 of the vibration piece 11 slides in the through hole 15 in the holder piece 16. This composite movement of the vibration piece 11 is transmitted to the tool holder shaft 9 through the following arrangement in order to cause the vibratory rotation of the tool holder shaft 9.

A straight transmission slot 17 is formed in the distal end of the vibration piece 11 whilst extending normal to the secondary axis H as best seen in FIG. 3 and a transmission bar 18 is slidably received in the transmission slot 17. A through hole 19 is formed near one end of the transmission bar 18 whilst extending in parallel to the secondary axis H. The tool holder shaft 9 is accompanied at its proximal end with a radial extension 6 which is provided with an eccentric pin 20 which extends towards the vibration piece 11. The eccentric pin 20 is idly inserted into the through hole 19 in the transmission bar 18.

In operation, rotation of the drive motor 1 causes concurrent rotation of the rotary holder 7 about the primary axis I at a reduced speed. This rotation of the rotary holder causes the above-described composite movement of the vibration piece 11 because of the eccentric arrangement of the vibration piece 11 with respect to the primary axis I. The composite movement of the vibration piece 11 is transmitted, via the transmission bar 18 and the radial extension 6, to the rotary holder shaft 9. As a consequence, the rotary holder shaft 9 performs vibratory rotation. That is, the rotary holder shaft 9 rotates about its own axis whilst revolving about the primary axis I. Note, that this rotation is derived from rotation of the rotary holder 7 at a speed reduced from the rotation speed of the drive shaft 1 due to presence of the reduction unit 3. Whereas, the above-described revolution is derived from the like revolution of the eccentric pin 10 which is directly secured to the drive shaft 1. As a result, the rotary holder shaft 9 rotates slowly whilst concurrently revolving rapidly.

The lubrication system in accordance with the present invention is incorporated into the tool holder of the above-described construction and function.

An outer oil reservoir 21 is formed between the rotary holder 7 and the casing 2 and an inner oil reservoir 22 is formed between the rotary holder 7 and the vibration piece 1i as best seen in FIG. 3. A radial conduit 23 is formed through the rotary holder 7 in order to communicate the outer oil reservoir 21 to the inner oil reservoir 22. The first pump unit 24 is arranged within the radial conduit 23 in order to force oil in the inner oil reservoir 21 out into the outer oil reservoir 22.

The first pump unit 24 includes a check valve 25. When the oil pressure within the inner oil reservoir 22 surpasses that within the outer oil reservoir 21, the check valve 25 opens to allow flow of oil from the inner oil reservoir 22 to the outer oil reservoir 21. Whereas, when the oil pressure within the outer oil reservoir 21 surpasses that within the inner oil reservoir 22, the check valve 25 closes to inhibit flow of oil from the outer oil reservoir 21 to the inner oil reservoir 22.

An oil conduit 26 is formed through the vibration piece 11 and the transmission rod 13 in order to introduce oil in the outer oil reservoir 21 into a space which is present between the eccentric pin 10 and the vibration piece 11 and majorly occupied by the bearing 12. Near the distal end of the tool holder, an oil storage 27 is defined by the casing 2 (see FIG. 1). An axial conduit 28 is formed in the rotary holder 7 in order to communicate the above-described outer oil reservoir 21 to the oil storage 27. A pipe 29 is coupled to the distal end of the axial conduit 28 whilst opening in the oil storage 27. At an exit to the outer oil reservoir 21, the second pump unit 30 is arranged in the axial conduit 28 in order to force oil within the oil storage 27 out into the outer oil reservoir 21 by assistance of revolution of the vibration piece 11.

More specifically, the second pump unit 30 includes a check valve 31. When oil pressure within the oil storage 27 surpasses that within the outer oil reservoir 21, the check valve 31 opens to allow flow of oil from the oil storage 27 to the outer oil reservoir 21. Whereas, when the oil pressure within the outer oil reservoir 21 surpasses that within the oil storage 27, the check valve 31 closes in order to inhibit reverse flow of oil.

The lubrication system in accordance with the present invention operates as follows.

As the vibration piece 11 revolves inside the rotary holder 7, the transmission rod 13 slides reciprocally in the through hole 15 to vary effective volumes of the outer and inner oil reservoirs 21, 22. As the effective volume of the outer oil reservoir 21 increases, that of the inner oil reservoir 22 decreases and vice versa (see FIG. 3).

Figure 4:
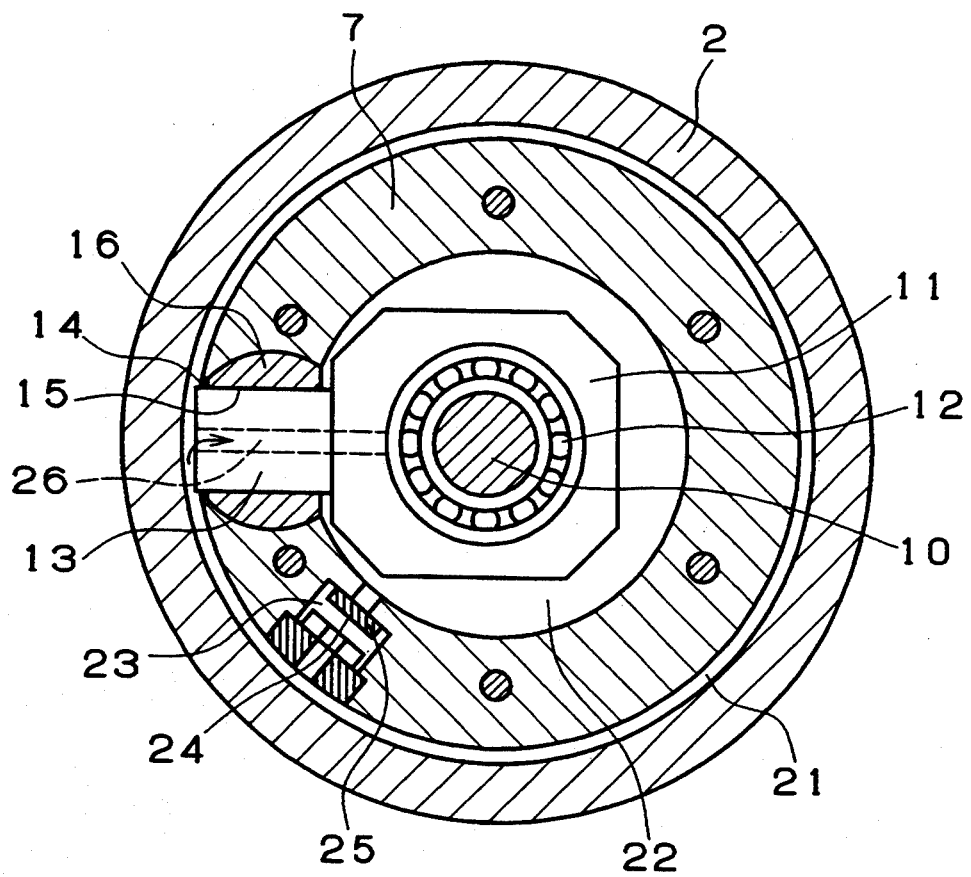
FIG. 4 is a like sectional view for showing operation of the first pump unit during the composite movement of the vibration piece.

When the effective volume of the outer oil reservoir 21 increases, the oil pressure within the outer oil reservoir 21 accordingly decreases and that within the inner oil reservoir 22 increases. This difference in pressure forces the first pump unit 24 to open its check valve 25 so that oil in the inner oil reservoir 22 flows out into the outer oil reservoir 21 through the radial conduit 23 in the rotary holder 7 (see FIG. 4).

When the effective volume of the inner oil reservoir 22 increases, the oil pressure within the inner oil reservoir 22 accordingly decreases and that within the outer oil reservoir 21 increases. This difference in pressure forces the first pump unit 24 to close its check valve 25 so that flow of oil between the two oil reservoirs 21 and 22 is inhibited. Due to increase in pressure, oil in the outer oil reservoir 21 is forced to flow, via the oil conduit 26, into the bearing 12 present between the eccentric pin 10 and the vibration piece 11. The oil introduced into the bearing 12 further permeates into the inner oil reservoir 22 through gaps between cooperating elements.

Continued revolution of the vibration piece 11 thus induces continued and repeated change in volume of the two oil reservoirs 21 and 22 so as to constantly force the oil to flow into the bearing 12 present between the eccentric pin 10 and the vibration piece.

Figure 5:
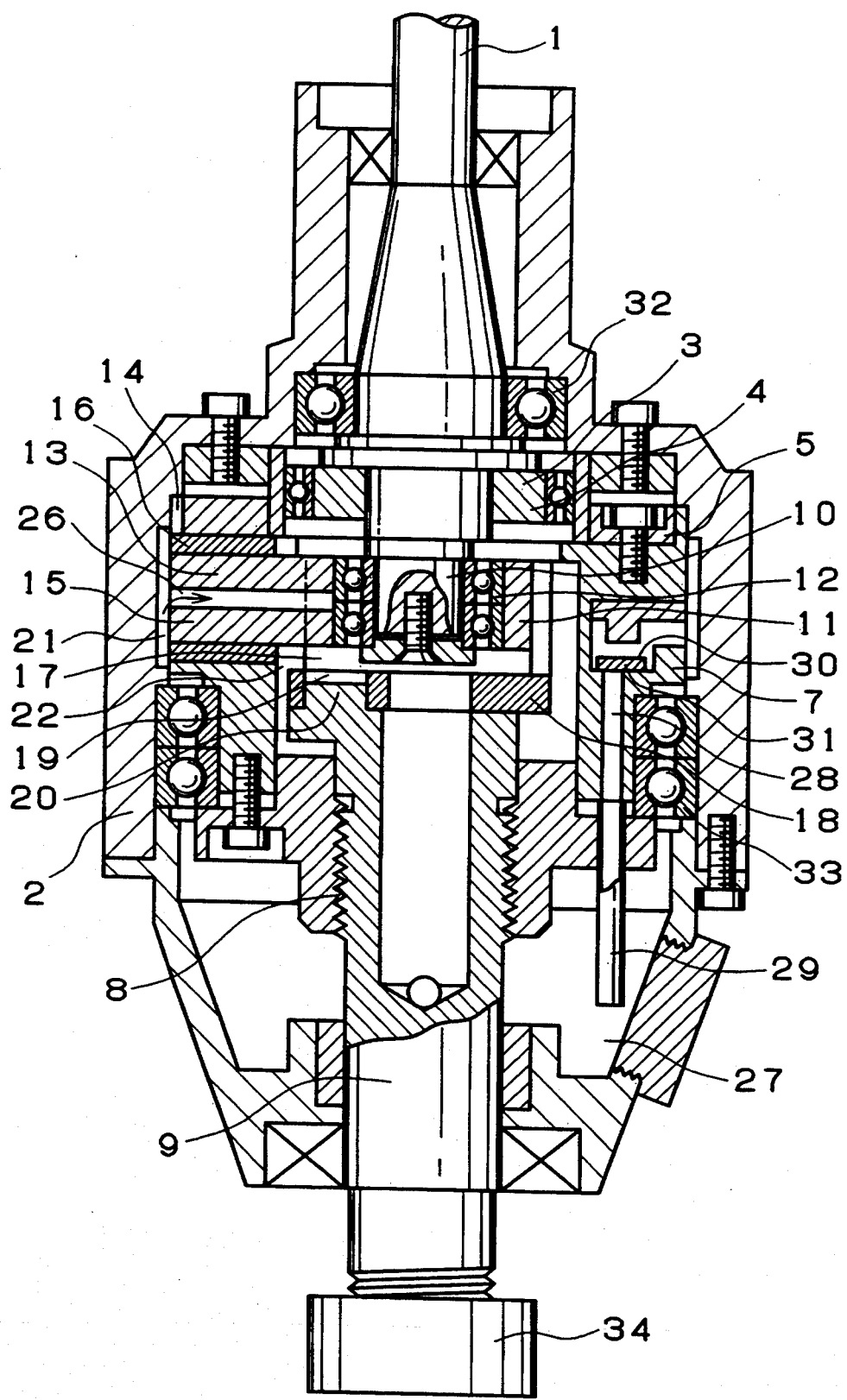
FIG. 5 is a sectional side view for showing operation of the second pump unit during the composite movement of the vibration piece.

As the effective volume of the outer oil reservoir 21 decreases with corresponding increase in pressure due to revolution of tile vibration piece 11, the second pump unit 30 is forced to close its check valve 31 (see FIG. 5). Whereas, when effective volume of the outer oil reservoir 21 increases with corresponding decrease in pressure, the check valve 31 opens so that oil in the oil storage 27 flows into the outer oil reservoir 21 through the axial conduit 28 in the rotary holder 7.

Continued revolution of the vibration piece 11 thus causes repeated flow of oil from the oil storage 27 into the outer oil reservoir 21 and further into the bearing 12 present between the eccentric pin 10 and the vibration piece 11.

As is clear from the foregoing descriptions, continued revolution of the vibration piece 11 derived from rotation of the drive shaft 1 induces repeated and inverse proportional change in pressure within the outer and inner oil reservoirs 21, 22 and resultant difference in pressure controls operation of two pump units (check valves) communicating the two oil reservoirs 21 and 22. As a result, oil is constantly fed to the bearing present between the eccentric pin 10 on the drive shaft 1 and the vibration 11 piece held by the rotary holder 7. Such constant lubrication well prevents undesirable seizure between cooperating element, thereby ensuring long continued operation of the tool holder to which the present invention is applied.

In the case of the above-described embodiment, the rotary holder 7 is operationally coupled to the drive shaft 1 via the reduction unit 3 for rotation at a reduced speed. Alternatively, the rotary holder 7 may be coupled to a separate drive source of a low speed of rotation. In this case, the reduction unit 3 may be omitted.

We claim:

1. A lubrication system for a tool holder comprising a tubular casing,
   a drive shaft rotatably mounted to said casing for rotation about a primary axis, and provided on its distal end with an eccentric pin having a secondary axis parallel to but deviated from said primary axis,
   a rotary holder arranged within said casing surrounding said eccentric pin for rotation about said primary axis at a speed lower than that of said drive shaft, and defining a tubular outer oil reservoir surrounded by said casing,
   a tool holder shaft coaxially carried by said rotary holder in an arrangement such that said holder shaft is able to rotate about its own longitudinal axis whilst concurrently revolving about said primary axis,
   a vibration piece rotatably inserted over said eccentric pin on said drive shaft, and provided with a radially extending transmission rod which is received at its outer end in said rotary holder in a longitudinally slidable and laterally rotatable fashion, said vibration piece defining a tubular inner oil reservoir surrounded by said rotary holder,
   a transmission bar slidably coupled to a distal end of said vibration piece, and coupled to a proximal end of said tool holder shaft at a spot deviated from said primary axis, and
   a first pump unit arranged in a first oil conduit for communicating said oil reservoirs to each other whilst allowing flow of oil from said inner oil reservoir to said outer oil reservoir only,
   said vibration piece and said transmission rod being provided with a second oil reservoir for communicating said outer oil reservoir to a space present between said eccentric pin and said vibration piece.

2. A lubrication system as claimed in claim 1 in which said rotary holder is coupled to said drive shaft via a reduction unit.

3. A lubrication system as claimed in claim 1 in which an oil storage is formed in said casing around said tool holder shaft,
   a third oil conduit is formed in said rotary holder in order to communicate said oil storage to said outer oil reservoir, and
   a second pump unit is arranged in said third oil conduit in order to allow flow of oil from said oil storage to said outer oil reservoir only.

4. A lubrication system as claimed in claim 1 in which a radial cutout is formed in said rotary holder whilst having a pair of opposite round walls,
   a holder piece is rotatably fitted into said radial cutout whilst having a through hole slidably receptive of said outer end of said transmission rod on said vibration piece.

* * * * *